United States Patent
Miyawaki et al.

(10) Patent No.: US 9,199,402 B2
(45) Date of Patent: Dec. 1, 2015

(54) PERMANENT MAGNET PRODUCTION METHOD

(71) Applicants: Hiroshi Miyawaki, Aichi (JP); Toshiyuki Morita, Aichi (JP); Tatsuya Kagohashi, Gifu (JP)

(72) Inventors: Hiroshi Miyawaki, Aichi (JP); Toshiyuki Morita, Aichi (JP); Tatsuya Kagohashi, Gifu (JP)

(73) Assignees: DAIDO STEEL CO., LTD., Aichi (JP); DAIDO ELECTRONICS CO., LTD., Gifu (JP)

( * ) Notice: Subject to any disclaimer, the term of this patent is extended or adjusted under 35 U.S.C. 154(b) by 308 days.

(21) Appl. No.: 13/736,277

(22) Filed: Jan. 8, 2013

(65) Prior Publication Data

US 2013/0175728 A1    Jul. 11, 2013

(30) Foreign Application Priority Data

Jan. 10, 2012   (JP) ................................. 2012-002512

(51) Int. Cl.
| | | |
|---|---|---|
| H01F 41/02 | (2006.01) | |
| B29C 47/00 | (2006.01) | |
| B21C 23/08 | (2006.01) | |
| B30B 11/22 | (2006.01) | |

(Continued)

(52) U.S. Cl.
CPC ........... B29C 47/0004 (2013.01); B21C 23/085 (2013.01); B30B 11/221 (2013.01);
(Continued)

(58) Field of Classification Search
CPC .... B21C 23/085; B21C 23/10; B21C 23/142; B21C 37/155; B21C 37/156; B29C 47/0004; B29C 2043/3211; B29C 47/00; B29C 2947/92276; B29C 2947/92771; B29C 2945/76157; B29C 2945/76642; H01F 41/0266; H01F 7/02; H01F 41/0253; H01F 41/028; H01F 41/0273; H01F 1/0555; H01F 1/0556; H01F 1/0575; H01F 1/0576; H01F 1/14747; B30B 11/221
USPC .............. 72/264–266, 253.1, 370.16, 370.17, 72/370.18, 370.2, 370.21, 370.23, 370.36, 72/467, 370.26; 29/607, 411–417
See application file for complete search history.

(56) References Cited

U.S. PATENT DOCUMENTS 5,711,074 A * 1/1998 Harimoto et al. ........ 29/898.066
7,325,434 B2 * 2/2008 Esaki et al. ..................... 72/343
(Continued)

FOREIGN PATENT DOCUMENTS

| JP | 50-2197 | 1/1975 |
|---|---|---|
| JP | 62-58004 | 4/1987 |
| JP | 63-260120 | 10/1988 |
| JP | 2001-015325 | 1/2001 |

OTHER PUBLICATIONS

Office Action issued in Japan Counterpart Patent Appl. No. 2012-002512, dated Jul. 14, 2015 , along with an English translation thereof.

*Primary Examiner* — Peter DungBa Vo
*Assistant Examiner* — Joshua D Anderson
(74) *Attorney, Agent, or Firm* — Greenblum & Bernstein, P.L.C.

(57) ABSTRACT

With a mandrel inserted in a through hole formed in an extrusion die, a preform filled in the through hole is extruded into a filling space defined between an inner surface of the through hole and an outer surface of the mandrel by pressing the preform with a pressing punch. Consequently, a cylindrical extruded form in which a plurality of stress concentration portions extending along an extruding direction are formed so as to be spaced apart from each other in a circumferential direction is formed. Then, an external force is applied to the extruded form thus obtained to thereby divide the extruded form at the stress concentration portions into a plurality of permanent magnets.

8 Claims, 6 Drawing Sheets

(51) Int. Cl.
  *B29C 47/20* (2006.01)
  *B29C 47/92* (2006.01)

(52) U.S. Cl.
  CPC .......... *H01F41/028* (2013.01); *B29C 47/0023* (2013.01); *B29C 47/0066* (2013.01); *B29C 47/20* (2013.01); *B29C 47/92* (2013.01); *B29C 2947/92704* (2013.01); *B29K 2995/0008* (2013.01)

(56) References Cited

U.S. PATENT DOCUMENTS

| | | | |
|---|---|---|---|
| 7,524,453 B2 * | 4/2009 | Ugai et al. | 419/38 |
| 7,814,632 B2 * | 10/2010 | Burkhardt | 29/417 |
| 8,819,921 B2 * | 9/2014 | Adachi | 29/607 |
| 2010/0181859 A1 * | 7/2010 | Hirai et al. | 310/156.13 |
| 2010/0244608 A1 * | 9/2010 | Nakamura et al. | 310/156.38 |

* cited by examiner

PRIOR ART

PERMANENT MAGNET PRODUCTION METHOD

FIELD OF THE INVENTION

The present invention relates to a method for producing a plurality of permanent magnets by way of extrusion.

BACKGROUND OF THE INVENTION

Permanent magnets, which are formed of a rare earth, an iron family metal and boron, and have a rectangular, arcuate, semi-elliptical or crescent cross section and are given magnetic anisotropy by way of hot (or warm) plastic working, have been used industrially and commercially. These permanent magnets are produced as follows, for example.

A raw material prepared by mixing a rare earth, an iron family metal and boron is melted, and the molten magnet alloy so obtained is jetted out onto a rotational roll of copper, for example, to produce an extremely rapidly quenched flaky ribbon made up of crystalline grains of a nanoscale size. The magnet alloy powder obtained by the extremely rapid quenching process is crushed into particles of a required diameter, which are then cold pressed into a compact. The compact is then hot or warm pressed into a body having high density, which is then subjected to hot or warm plastic working to thereby form a magnet material of a desired shape having magnetic anisotropy. As a plastic working process to impart the magnetic anisotropy to the resulting magnet material, an extrusion process that is superior in material yield and acceptable product ratio is employed. The magnet material that has been subjected to plastic working is magnetized in a later step, whereby a practically useful permanent magnet having magnetic anisotropy is provided.

For example, JP-A-2001-15325 discloses and proposes a method for producing a plurality of permanent magnets having a radial anisotropy, for example, those having an arcuate cross section, by an extrusion process. In JP-A-2001-15325, a finned mandrel is inserted into a through hole formed in a die to define a plurality of divided holes, which coincide with a sectional shape of a permanent magnet to be obtained, between the mandrel and an inner wall of the die which defines the through hole. Then, a cylindrical blank filled in the through hole is pressed by a punch and the blank is extruded from the individual divided holes, whereby a plurality of permanent magnets which are anisotropic in a radial direction are produced.

In the production method disclosed in JP-A-2001-15325, there have been fears that, when the blank is extruded, the crystal orientation is not aligned at portions of the cylindrical blank where the cylindrical blank is divided by the fins of the mandrel, and hence the magnetic properties of the permanent magnets obtained are lowered at the divided portions. Additionally, since the blank is divided while being extruded, stress is increased at the divided portions, and the divided portions of the permanent magnets obtained may be cracked. Therefore, the cracked defective portions have to be ground out in a later step, leading to a problem that a grinding amount is increased to reduce the yield.

SUMMARY OF THE INVENTION

In view of the problem inherent in the conventional art described above, the invention has been made to solve the problem, and an object thereof is to provide a permanent magnet production method for producing permanent magnets having superior magnetic anisotropy with good efficiency.

In order to solve the above-mentioned problem and achieve the above-mentioned object, a first aspect of the present invention is a method for producing permanent magnet, comprising: with a mandrel inserted in a through hole formed in an extrusion die, extruding a preform filled in the through hole into a filling space defined between an inner surface of the through hole and an outer surface of the mandrel by pressing the preform with a pressing punch, thereby forming a cylindrical extruded form in which a plurality of stress concentration portions extending along an extruding direction are formed so as to be spaced apart from each other in a circumferential direction; and applying an external force to the extruded form obtained to thereby divide the extruded form at the stress concentration portions into a plurality of permanent magnets.

According to the first aspect of the present invention, an extruded form formed by an extrusion process is divided into a plurality of permanent magnets. Therefore, the compression direction (crystalline orientation direction) applied to the extruded form at the extrusion process is wholly aligned to thereby exert superior magnetic anisotropy, the magnetic properties of the respective permanent magnets at the divided portions are not lowered, and a plurality of permanent magnets excellent in magnetic anisotropy can be produced. In addition, since a large stress is not applied to the portions of the extruded form to be divided in the extrusion process, a crack does not occur at the divided portions of the permanent magnet and the yield of the raw material can be improved. Furthermore, since stress concentration portions for dividing the permanent magnet are formed in the extrusion process, production efficiency can be increased in comparison with a case where stress concentration portions are formed separately in a later step.

According to a second aspect of the present invention, in the above-mentioned method for producing permanent magnet, each of the stress concentration portions is formed on an inner surface and/or an outer surface of the extruded form by two surfaces which are successively connected in a circumferential direction so as to form an angle. In accordance with the second aspect of the present invention, flatness of the division surfaces of the permanent magnet can be increased and the external appearance of the permanent magnet can be improved.

According to a third aspect of the present invention, in the above-mentioned method for producing permanent magnet, projecting portions which project to the filling space are provided on the inner surface of the through hole in the extrusion die or the outer surface of the mandrel so as to project therefrom, and grooves as radially depressed stress concentration portions by the projecting portions are formed on an inner surface or an outer surface of an extruded form which is extruded to the filling space. In accordance with the third aspect of the present invention, flatness of the division surfaces of the permanent magnet can be further increased.

According to a fourth aspect of the present invention, in the above-mentioned method for producing permanent magnet, an extruded form, which is formed so that a radial thickness $T_1$ of the stress concentration portion is in a range of $\frac{1}{5}T_0 < T_1 < \frac{4}{5}T_0$ relative to a radial maximum thickness $T_0$, is divided at the stress concentration portions. In accordance with the fourth aspect of the present invention, division of the extruded form at the stress concentration portions becomes easy and the decrease in orientation properties can be suppressed.

According to a fifth aspect of the present invention, in the above-mentioned method for producing permanent magnet, the extruded form is compressed in a radial direction so that the extruded form is divided at the stress concentration portions. In accordance with the fifth aspect of the present invention, the division of the extruded form becomes easy.

According to the permanent magnet production method of the invention, it is possible to produce permanent magnets having superior magnetic anisotropy with good efficiency.

BRIEF DESCRIPTION OF THE DRAWINGS

FIGS. 3A to 3C show explanatory diagrams depicting a production process of the permanent magnets according to Embodiment 1, in which FIG. 3A depicts an extruded form which is formed by the extrusion apparatus, FIG. 3B depicts a state in which the extruded form is to be divided at stress concentration portions and FIG. 3C depicts a state in which the extruded form is divided into a plurality of permanent magnets.

FIGS. 4A and 4B show explanatory diagrams depicting a production process of permanent magnets of a crescent cross section according to Embodiment 2, in which FIG. 4A depicts a state in which an extruded form formed by the extrusion apparatus is to be divided at stress concentration portions, and FIG. 4B depicts a state in which the extruded form is divided into a plurality of permanent magnets.

FIGS. 5A and 5B show explanatory diagrams depicting a production process of permanent magnets of a semi-elliptical cross section according to Embodiment 3, in which FIG. 5A depicts a state in which an extruded form formed by the extrusion apparatus is to be divided at stress concentration portions, and FIG. 5B depicts a state in which the extruded form is divided into a plurality of permanent magnets.

FIGS. 6A and 613 show explanatory diagrams respectively depicting an extrusion die and a mandrel of the extrusion apparatus for producing permanent magnets of an arcuate cross section according to Embodiment 4.

FIGS. 7A and 7B show explanatory diagrams depicting a production process of the permanent magnets according to Embodiment 4, in which FIG. 7A depicts a state in which an extruded form formed by the extrusion apparatus is to be divided at stress concentration portions, and FIG. 7B depicts a state in which the extruded form is divided into a plurality of permanent magnets.

FIGS. 8A and 8B show charts depicting the results of measurement of degrees of magnetic orientation in an experimental example, in which FIG. 8A depicts the result of an example of the invention, and FIG. 8B depicts the result of a comparison example.

DESIGNATION OF REFERENCE NUMERALS AND CHARACTERS

Figure 1:
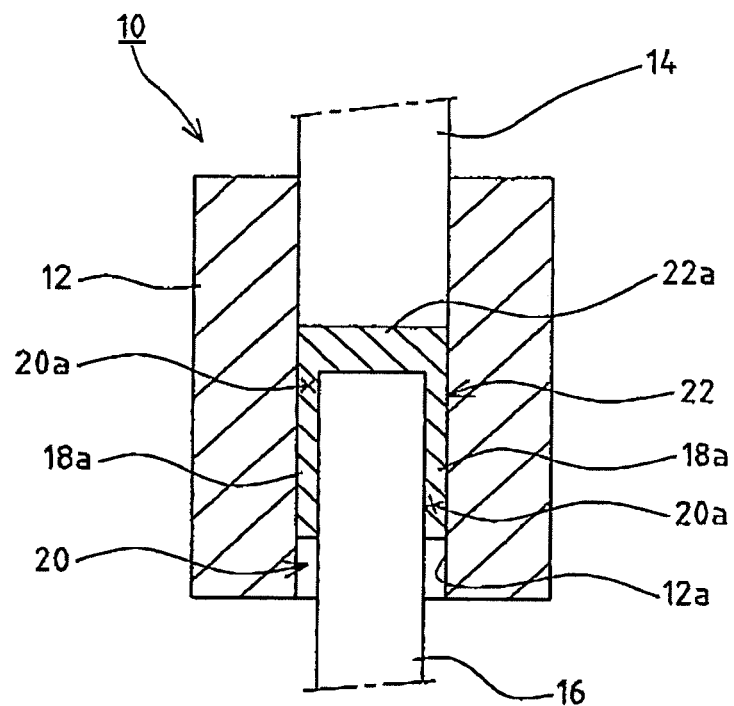
FIG. 1 is a schematic diagram depicting an extrusion die, a pressing punch and a mandrel of an extrusion apparatus for producing a permanent magnet according to Embodiments.

12: extrusion die
12a: through hole
14: pressing punch
16: mandrel
18: permanent magnet having rectangular cross section
20: filling space
22: primary extruded form (extruded form)
24: secondary extruded form (extruded form)
28: stress concentration portion
32: permanent magnet having crescent cross section
34: permanent magnet having semi-elliptical cross section
36: permanent magnet having arcuate cross section
38: inner projection (projecting portion)
40: outer projection (projecting portion)
$T_0$: radial maximum thickness of extruded form
$T_1$: radial thickness of stress concentration portion

DETAILED DESCRIPTION OF THE INVENTION

Next, referring to the accompanying drawings, permanent magnet production methods according to the invention will be described based on preferred embodiments as below.

Embodiments

FIG. 1 shows a preferred embodiment of an extrusion apparatus for use in a permanent magnet production method. An extrusion apparatus 10 includes an extrusion die 12 in which a through hole 12a is formed so as to penetrate therethrough in an extruding direction, a pressing punch 14 which is to be inserted into the through hole 12a from one of openings thereof, and a mandrel 16 that is to be inserted into the through hole 12a from the other opening thereof and which has a diameter smaller than that of a bore of the through hole 12a. With the mandrel 16 inserted into the through hole 12a, a filling space 20 is defined between an inner surface of the through hole 12a (an inner wall of the extrusion die 12 in which the through hole 12a is defined) and an outer surface of the mandrel 16 so as to communicate along the full circumference of the mandrel 16. The filling space 20 is formed into a cylindrical space made up of a plurality of forming spaces 20a which are defined contiguously so as to communicate with each other in a circumferential direction and which substantially coincide with cross-sectional shapes of permanent magnets 18, 32, 34, 36 to be produced, in which the cross-sectional shapes are taken along a direction perpendicular to an extruding direction. The shape of the forming space 20a may be changed by changing the respective shapes of the mandrel 16 and the through hole 12a. Then, a cylindrical primary extruded form (an extruded form) 22, in which a plurality of formed portions 18a, 32a, 34a, 36a which coincide with cross-sectional shapes of permanent magnets 18, 32, 34, 36 to be obtained stretch continuously in a circumferential direction, can be formed from a cylindrical preform by the extrusion apparatus 10.

The preform is obtained in the following manner. A raw material prepared by mixing a rare earth, an iron family metal and boron is melted, and the molten material so obtained is jetted out onto a rotational roll to produce an extremely rapidly quenched flaky ribbon. The magnet alloy powder obtained is crushed into particles of a required diameter, which are then cold pressed into a compact. The compact is then preheated to a required temperature (a temperature at which the compact is hot or warm pressed) in an atmosphere of inactive gas (for example, Ar) and is thereafter hot or warm pressed to thereby be highly densified. In addition, although Y and/or lanthanoid can be adopted as the rare earth, in particular, Nd, Pr, Dy, Tb or a mixture of two or more thereof can preferably be adopted. Further, although Fe, Co and/or Ni can be adopted as the iron family metal, in particular, Fe, Co or a mixture of those metals can preferably be adopted. It should be noted that Ca may be added as required in order to improve the plastic workability (or cracking resistance). Additionally, the preform which is highly densified by hot or warm pressing is preheated to a temperature at which the preform is extruded by the extrusion apparatus 10 under the atmosphere of inactive gas (for example, Ar) and is then held at the temperature.

Preheating that is executed when a preform is molded and preheating that is executed before a preform is extruded by the extrusion apparatus 10 may be executed according to the type of a magnet material used or working conditions such as working schedule, and such preheating may also be omitted.

Here, as a general form of a motor in which a permanent magnet is used, there are raised a surface permanent magnet (SPM) motor in which a permanent magnet is mounted on a surface of a rotor and an interior permanent magnet (IPM) motor in which a permanent magnet is embedded in an interior of a rotor, Permanent magnets 32, 36, 34 having, respectively, a crescent cross section, an arcuate cross section and a semi-elliptical cross section are preferably adopted for the surface permanent magnet motor, while permanent magnets 18, 36 having, respectively, a rectangular cross section and the arcuate cross section are preferably adopted for the interior permanent magnet motor. In addition, it is possible to produce the permanent magnets 18, 32, 34, 36 having the aforesaid different types of cross sections by the extrusion apparatus 10 by changing the respective shapes of the mandrel 16 and the through hole 12a. Then, processes of producing those permanent magnets 18, 32, 34, 36 having the aforesaid different types of cross sections will be described hereinafter one by one.

Embodiment 1

Figure 2:
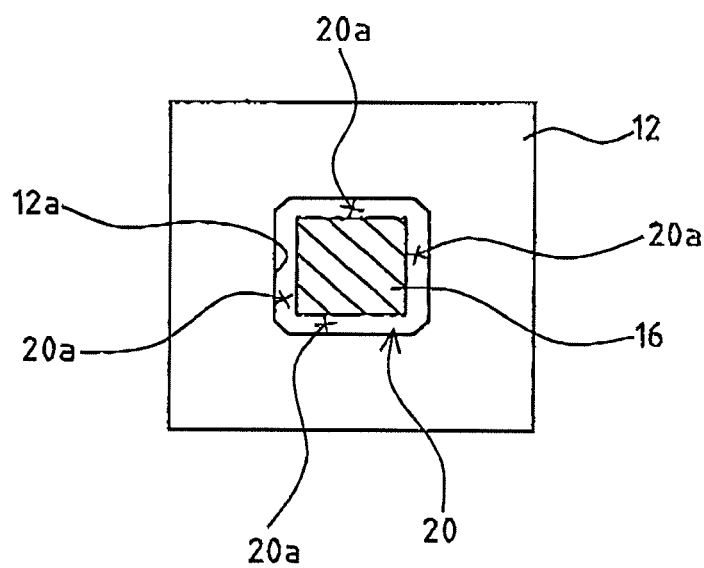
FIG. 2 is a schematic diagram depicting a bottom view of an extrusion apparatus formed to produce permanent magnets of a rectangular cross section according to Embodiment 1 with a mandrel inserted into a through hole in an extrusion die.

In Embodiment 1, a process of producing a permanent magnet 18 having a rectangular cross section will be described. In Embodiment 1, a through hole 12a having a substantially rectangular opening shape is formed in the extrusion die 12, as shown in FIG. 2. Additionally, in the extrusion die 12, an inclined surface which is inclined at a predetermined angle (45° in this embodiment) is formed at every corner of the through hole 12a. The mandrel 16 has a rectangular cross section which is smaller than the through hole 12a. Then, with the mandrel 16 inserted into the through hole 12a, a filling space 20 having an angular tube-like shape as a whole is defined along a full circumference of the mandrel 16. With the mandrel 16 so disposed, forming spaces 20a each having a rectangular cross section are defined on outer sides of four surfaces of the mandrel 16, and the filling space 20 is made up by connecting together these forming spaces 20a at the corner portions of the through hole 12a so that they communicate with each other. The mandrel 16 is inserted into the through hole 12a in such a state that corner portions thereof face the corresponding inclined surfaces of the extrusion die 12. In addition, in the filling space 20 defined in such a state that the mandrel 16 is inserted into the through hole 12a, a radial gap defined between the mandrel 16 and the inclined surface is set smaller than a radial gap defined in a portion where a surface of the through hole 12a faces the surface of the mandrel 16.

In the extrusion apparatus 10, a preform which is preheated is inserted into the through hole 12a from one opening to thereby be filled therein, and the mandrel 16 is inserted into the through hole 12a from the other opening thereof, in which state the pressing punch 14 is inserted into the through hole 12a from the one opening to press the preform. Consequently, the preform is extruded into the filling space 20 which is defined between the outer surfaces of the mandrel 16 and an inner surface of the through hole 12a, whereby a primary extruded form 22 shown in FIG. 1 is formed. This primary extruded form 22 is magnetically anisotropic in a thickness direction perpendicular to an extruding direction which is a compressing direction when extrusion is executed. The primary extruded form 22 which is formed by the extrusion apparatus 10 is discharged from the through hole 12a in such a state that a bottom portion 22a is provided at an end portion of a tubular portion in which a plurality of (four in this embodiment) formed portions 18a each having a rectangular cross section are coupled together in a circumferential direction as a result of the primary extruded form 22 being extruded into the filling space 20. Then, the bottom portion 22a is removed from the primary extruded form 22 to thereby obtain a secondary extruded form (an extruded form) 24 (refer to FIG. 3A) having an angular tube-like shape which is opened at front and rear thereof in the extruding direction.

Figure 3A:
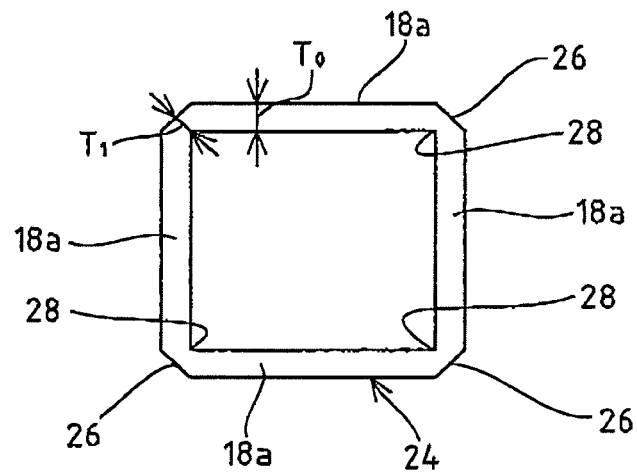
Figure 3B:
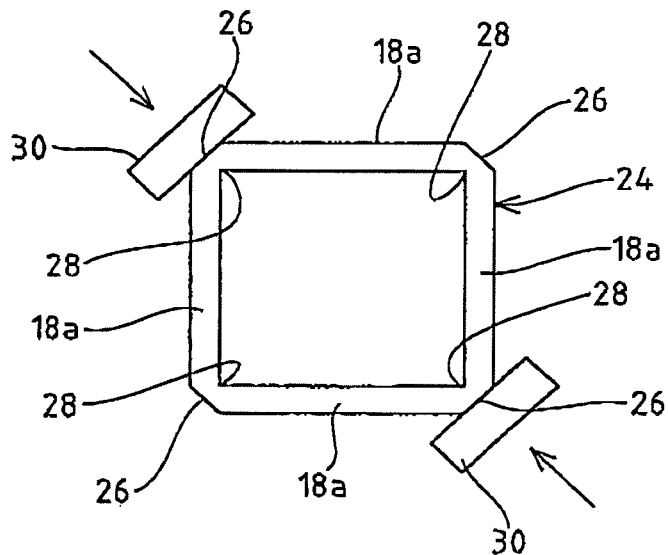
Figure 3C:
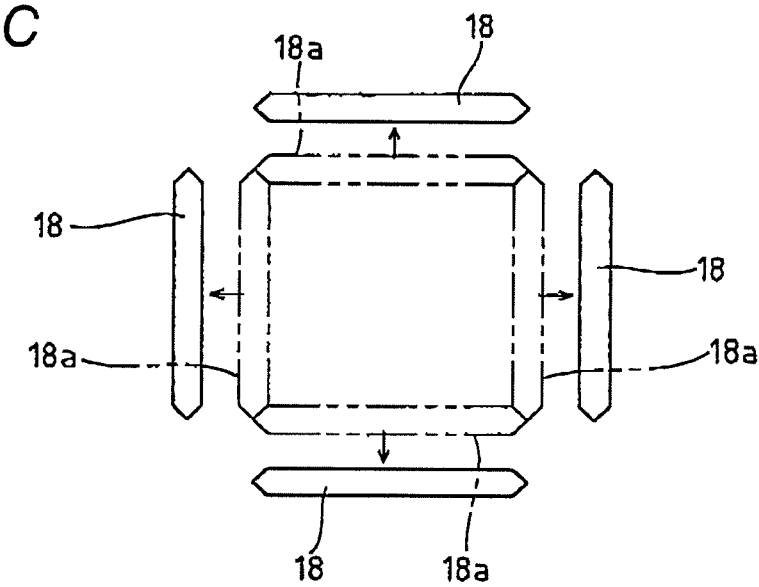

As shown in FIG. 3A, the secondary extruded form 24 is formed into an angular tube-like shape which has a rectangular cross section inside and inclined surfaces 26 outside which are formed at portions corresponding to corners of the rectangular cross section. Namely, an angular corner portion where two surfaces of the inside of the secondary extruded form 24 connect to each other so as to form an angle functions as a stress concentration portion 28 where a stress concentrates when an external force is applied to the secondary extruded form 24. Namely, in Embodiment 1, the stress concentration portion 28 is formed inside a connecting portion of formed portions 18a, 18a which are connected together in a circumferential direction. Additionally, a thickness of the corner portion of the secondary extruded form 24 where the stress concentration portion 28 is formed is made thinner than the other portions thereof (or the stress concentration portion 28 is made more brittle than the other portions) as a result of the inclined surface 26 being formed thereat. Then, as shown in FIG. 3B, dividing jigs 30 are applied individually to a pair of oppositely facing inclined surfaces 26 and are then caused to approach each other so as to apply a pressure to the corresponding stress concentration portions 28 which oppositely face each other in a direction in which the stress concentration portions 28 so face each other (i.e., in a radial direction), whereby the secondary extruded form 24 is divided at four stress concentration portions 28 which extend over an overall length of the secondary extruded form 24 in a longitudinal direction (extruding direction) as starting points. As a result, as shown in FIG. 3C, the secondary extruded form 24 is divided into four portions. Then, by working the portions where the inclined surfaces 26 are formed as required, permanent magnets 18 having a rectangular cross section are obtained.

In Embodiment 1, in the secondary extruded form 24 which is obtained by way of extrusion, as shown in FIG. 3A, an upper limit value of a thickness (radial thickness) $T_1$ at the stress concentration portion 28 is preferably set to $T_1 < 4/5 T_0$ relative to a maximum thickness $T_0$ of the secondary extruded form 24 and is more preferably set to $T_1 < 3/5 T_0$. Additionally, a lower limit value of the thickness (radial thickness) $T_1$ at the stress concentration portion 28 is preferably set to $T_1 > 1/5 T_0$ relative to the maximum thickness $T_0$ of the secondary extruded form 24 and is more preferably set to $T_1 > 2/5 T_0$. Namely, when the thickness $T_1$ at the stress concentration portion 28 is made larger than the upper limit value (i.e., in the case where $T_1 \geq 4/5 T_0$), a large force is required when dividing the secondary extruded form 24 at the stress concentration portions 28, leading to fears that the secondary extruded form 24 fails. In contrast with this, when the thickness $T_1$ at the stress concentration portion 28 is made smaller than the lower limit value (i.e., in the case where $T_1 \leq 1/5 T_0$), the plastic deformation when forming the stress concentration portions 28 in extrusion of the primary extruded form 22 becomes large, leading to fears that the orientation properties are deteriorated.

In this way, in the production method of permanent magnets 18 according to Embodiment 1, the plurality of permanent magnets 18 are produced by dividing the secondary extruded form 24 which is discharged from the extrusion apparatus 10 at the end of extrusion at the stress concentration portions 28. Because of this, no large force is applied to the dividing portions at the time of extrusion, and hence, no grinding is required in a later step to grind out defective portions, thereby improving the yield. Additionally, compared with the conventional method in which the preform is divided while being pressed by the fins on the mandrel at the time of extrusion as in the conventional art, according to the production method of Embodiment 1, it is possible to obtain the plurality of permanent magnets 18 in which crystals are aligned in the same direction at the portions where the permanent magnets 18 are divided to thereby provide superior magnetic anisotropy, and the magnetic properties of each permanent magnet 18 become uniform. Namely, it is possible to produce the permanent magnets 18 having superior magnetic properties with good yield. Further, the stress concentration portions 28 where the secondary extruded form 24 is to be divided into the plurality of portions are formed simultaneously at the time of extrusion (at the time of extrusion of the primary extruded form 22). Thus, compared with a method in which stress concentrations 28 are formed separately in a later step, the number of steps involved can be reduced, thereby making it possible to increase the production efficiency. In addition, the stress concentration portion 28 is such that the two surfaces which form the stress concentration portion 28 are connected together so as to form an angle, and therefore, when an external force is applied to the secondary extruded form 24, the secondary extruded form 24 is divided in a good shape at the stress concentration portions 28 as starting points, thereby making it possible to obtain divided surfaces having high flatness. Namely, the flatness of the divided surfaces of the permanent magnets 18 which are divided from the secondary extruded form 24 is high, and hence, the resulting permanent magnets 18 have a good external appearance. Incidentally, the permanent magnets 18 divided from the secondary extruded form 24 are magnetized in a later step, whereby practically useful permanent magnets having magnetic anisotropy are provided.

Embodiment 2

Figure 4A:
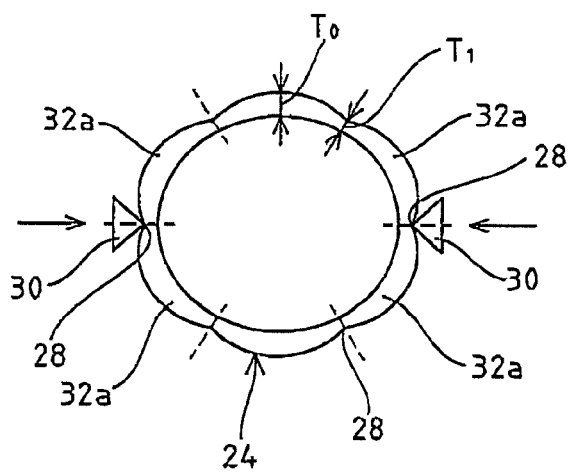
Figure 4B:
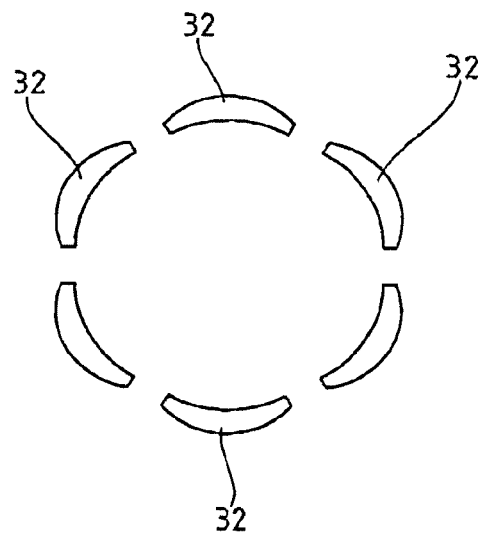

While the production of the permanent magnets 18 having a rectangular cross section is described in Embodiment 1, by changing the respective shapes of the through hole 12a in the extrusion die 12 and the mandrel 16, it is possible to produce permanent magnets 32 having a crescent cross section as shown in FIG. 4B.

Namely, when producing permanent magnets 32 having a crescent cross section, the respective shapes of a mandrel 16 and a through hole 12a are set so that with the mandrel 16 inserted into the through hole 12a, a cylindrical filling space 20 in which forming spaces 20a each having a crescent cross section stretch in a circumferential direction in a communicating fashion is defined between an outer surface of the mandrel 16 and an inner surface of the through hole 12a. Then, by pressing a cylindrical preform which is filled in the through hole 12a by a pressing punch 14, a bottomed cylindrical primary extruded form 22, which has a cylindrical portion in which formed portions 32a each having a crescent cross section are connected together in the circumferential direction, is formed. Then, by cutting off a bottom portion 22a from the primary extruded form 22, a substantially cylindrical secondary extruded form 24 is formed.

In Embodiment 2, as shown in FIG. 4A, the secondary extruded form 24 is formed so that a circular cross section is defined inside and arcuate ridges and v-shaped roots stretch continuously and alternately in the circumferential direction outside. Namely, in Embodiment 2, stress concentration portions 28 are formed on outer surfaces of connecting portions where the formed portions 32a which stretches continuously in the circumferential direction are connected together. In Embodiment 2, in the secondary extruded form 24 which is obtained by way of extrusion, as with Embodiment 1, an upper limit value and a lower limit value of a thickness (radial thickness) $T_1$ at the stress concentration portion 28 is preferably set to be in the range of $\frac{1}{5}T_0<T_1<\frac{4}{5}T_0$ relative to a maximum thickness $T_0$ of the secondary extruded form 24 and is more preferably set to be in the range of $\frac{2}{5}T_0<T_1<\frac{3}{5}T_0$.

In Embodiment 2, as shown in FIG. 4A, dividing jigs 30 are applied to stress concentration portions 28 which oppositely face each other from the outside thereof, and then, the dividing jigs 30 are caused to approach each other so as to hold the secondary extruded form 24 therebetween in the radial direction, whereby the secondary extruded form 24 is divided at the individual stress concentration portions 28 which extend over an overall length of the secondary extruded form 24 in a longitudinal direction (extruding direction) as starting points. Thus, as shown in FIG. 4B, six permanent magnets 32 each having the crescent cross section can be obtained. In Embodiment 2, too, as with Embodiment 1, it is possible to produce the permanent magnets 32 having superior magnetic properties with good yield. Additionally, the permanent magnets 32 having the crescent cross section each have uniform magnetic properties and a good external appearance.

Embodiment 3

In Embodiment 3, a production of permanent magnets 34 having a semi-elliptical cross section shown in FIG. 5B will be described. Namely, when producing permanent magnets 34 having a semi-elliptical cross section, the respective shapes of a madrel 16 and a through hole 12a are set so that with the mandrel 16 inserted into the through hole 12a, a cylindrical filling space 20 in which forming spaces 20a each having a semi-elliptical cross section stretch in a circumferential direction in a communicating fashion is defined between outer surfaces of the mandrel 16 and an inner surface of the through hole 12a. Then, by pressing a cylindrical perform which is filled in the through hole 12a by a pressing punch 14, a bottomed cylindrical primary extruded form 22, which has a cylindrical portion in which formed portions 34a each having a semi-elliptical cross section are connected together in the circumferential direction, is formed. Then, by cutting off a bottom portion 22a from the primary extruded form 22, a substantially cylindrical secondary extruded form 24 is formed. In Embodiment 3, in the secondary extruded form 24 which is obtained by way of extrusion, as with Embodiment 1, an upper limit value and a lower limit value of a thickness (radial thickness) $T_1$ at the stress concentration portion 28 is preferably set to be in the range of $\frac{1}{5}T_0<T_1<\frac{4}{5}T_0$ relative to a maximum thickness $T_0$ of the secondary extruded form 24 and is more preferably set to be in the range of $\frac{2}{5}T_0<T_1<\frac{3}{5}T_0$.

Figure 5A:
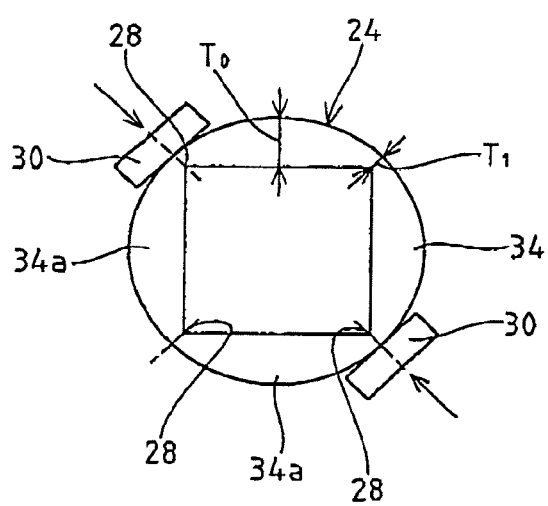
Figure 5B:
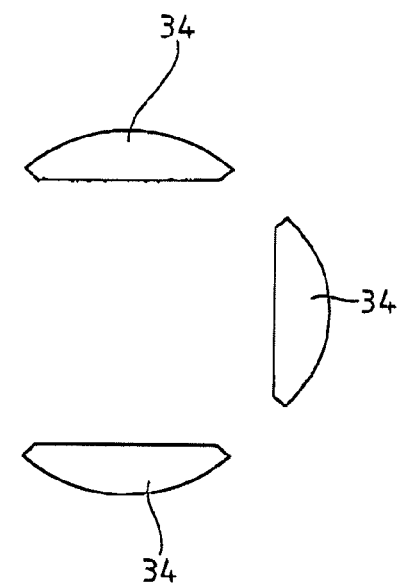

In Embodiment 3, as shown in FIG. 5A, the secondary extruded form 24 is formed to have a rectangular cross section inside and a circular cross section outside. In the secondary extruded form 24 in Embodiment 3, as with Embodiment 1, inner corner portions function as stress concentration portions 28. Then, as shown in FIG. 5A, dividing jigs 30 are applied to the stress concentration portions 28 which oppositely face each other from the outside thereof, and then, the dividing jigs 30 are caused to approach each other so as to compress the secondary extruded form 24 therebetween in the radial direction, whereby the secondary extruded form 24 is divided at the individual stress concentration portions 28 which extend over an overall length of the secondary extruded form 24 in a longitudinal direction (extruding direction) as starting points. Thus, as shown in FIG. 5B, four permanent magnets 34 each having a semi-elliptical cross section can be obtained. In Embodiment 3, too, as with Embodiment 1, it is possible to produce the permanent magnets 34 having superior magnetic properties with good yield. Additionally, the permanent magnets 34 having the semi-elliptical cross section each have uniform magnetic properties and a good external appearance.

Embodiment 4

Figure 6A:
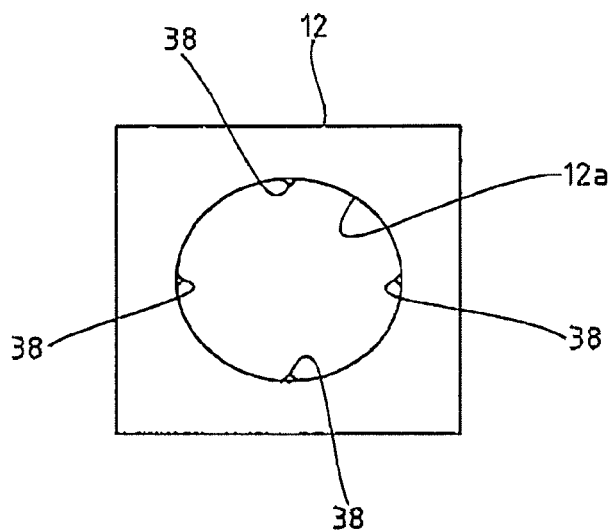
Figure 6B:
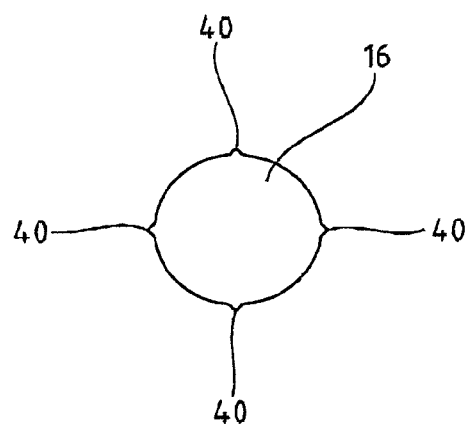

In Embodiment 4, a production of permanent magnets 36 each having an arcuate cross section will be described. Namely, when producing permanent magnets 36 having an arcuate cross section, the respective shapes of a mandrel 16 and a through hole 12a are set so that with the mandrel 16 inserted into the through hole 12a, a cylindrical filling space 20 is defined between an outer surface of the mandrel 16 and an inner surface of the through hole 12a. In addition, when producing permanent magnets 36 having an arcuate cross section as in Embodiment 4, in order to form stress concentration portions 28 at the time of extrusion, as shown in FIGS. 6A and 6B, a plurality of inner projections (projecting portions) 38 are provided on the inner surface of the through hole 12a in the extrusion die 12 in positions which correspond to a distal end portion of the mandrel 16 which is inserted into the through hole 12a so as to be spaced apart from each other in a circumferential direction. Additionally, outer projections (projecting portions) 40 are provided at a distal end portion on the outer surface of the mandrel 16 so as to correspond to the inner projections 38. Then, a cylindrical preform filled in the through hole 12a in which the mandrel 16 is inserted is pressed by a pressing punch 14, whereby radially depressed groove-shaped stress concentration portions 28 are formed on an outer surface and an inner surface of a primary extruded form 22 which correspond to the inner projections 38 and the outer projections 40, respectively, in the process of extrusion of the first extruded form 22. Then, the stress concentration portions 28 are formed on the primary extruded form 22, which will be a secondary extruded form when discharged from the forming die 12, along an overall length thereof in the extruding direction. Thus, the bottomed cylindrical primary extruded form 22, which has a cylindrical portion in which a plurality of formed portions 36a which are divided by the stress concentration portions 28 which lie adjacent to each other in the circumferential direction are connected together in the circumferential direction, is formed.

Figure 7A:
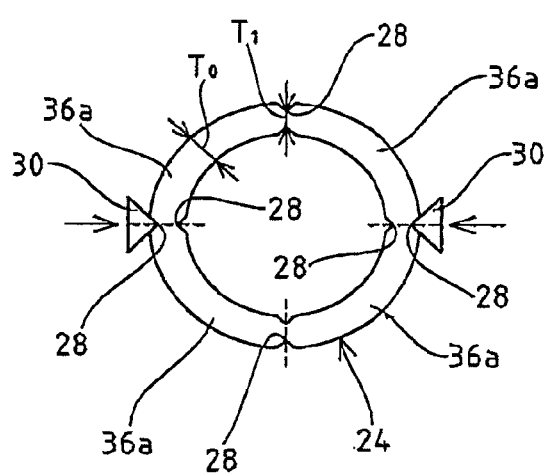

In Embodiment 4, in a secondary extruded form 24 which is obtained by way of extrusion shown in FIG. 7A, as with Embodiment 1, an upper limit value and a lower limit value of a thickness (radial thickness) $T_1$ at the stress concentration portion 28 is preferably set to be in the range of $1/5 T_0 < T_1 < 4/5 T_0$ relative to a maximum thickness $T_0$ of the secondary extruded form 24 and is more preferably set to be in the range of $2/5 T_0 < T_1 < 3/5 T_0$.

Here, as has been described before, the inner projections 38 on the extrusion die 12 and the outer projections 40 on the mandrel 16 are preferably provided on the inner surface of the die and the outer surface of the mandrel 16 in the positions corresponding to the distal end portion of the mandrel 16 when the mandrel 16 is inserted into the through hole 12a. However, the inner projections 38 on the extrusion die 12 may be provided further rearwards in the extruding direction than the distal end portion of the mandrel 16 which is inserted into the through hole 12a, so long as the outer projections 40 and the corresponding inner projections 38 are aligned in the radial direction as viewed from the extruding direction. Additionally, the flatness of divided surfaces resulting when the formed portions 36a are divided at the stress concentration portions 28 increases further as the acuteness of a distal end (root of groove) of the groove-shaped stress concentration portion 28 which is formed by the inner projection 38 and the outer projection 40 increases. Therefore, it is preferable that the inner projection 38 and the outer projection 40 are shaped to have a triangular cross section and that an internal angle on a projecting end portion side is acute. The cross sectional shape of the inner projection 38 and the outer projection 40 is not limited to the triangular one, and hence, the inner projection 38 and the outer projection 40 may be shaped to have a rectangular cross section or an arcuate cross section in which a projecting end portion is formed into an arcuate shape.

Figure 7B:
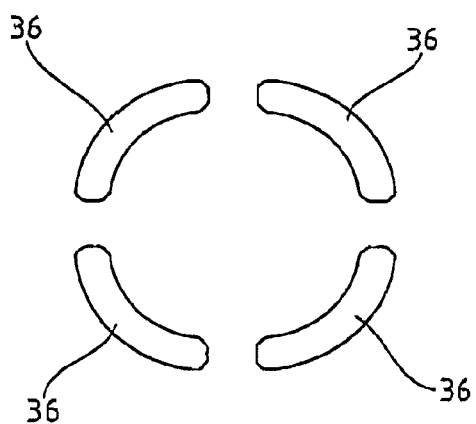

As shown in FIG. 7A, the secondary extruded form 24 of Embodiment 4 is formed into a cylindrical form in which a plurality of (four in Embodiment 4) formed portions 36a which are divided circumferentially by the stress concentration portions 28 which are formed on an outer surface and an inner surface thereof so as to correspond to each other in the radial direction are connected together. Namely, in the secondary extruded form 24 in Embodiment 4, the stress concentration portions 28 are formed on outer surfaces and inner surfaces of connecting portions where the formed portions 36a, 36a are connected together in the circumferential direction. Then, as shown in FIG. 7A, dividing jigs 30 are applied to outsides of the stress concentration portions 28 which oppositely face each other across the center of the secondary extruded form 24, and the dividing jigs 30 are caused to approach each other so as to compress the secondary extruded form 24 in the radial direction therebetween, whereby the secondary extruded form 24 is divided at the stress concentration portions 28 which extend along the full length of the secondary extruded form 24 in a longitudinal direction (extruding direction), and as shown in FIG. 7B, four permanent magnets 36 each having an arcuate cross section are obtained. In Embodiment 4, too, as with Embodiment 1, it is possible to produce the permanent magnets 36 having superior magnetic properties with good yield. Additionally, the resultant permanent magnets 36 having the arcuate cross section each have uniform magnetic properties and a good external appearance. In addition, in Embodiment 4, the stress concentration portion 28 which is formed by the projections 38 and 40 are formed substantially into the V-shaped groove, and therefore, the flatness of the divided surface of the permanent magnet 36 which is divided at the stress concentration portion 28 is increased further, and the external appearance of the resultant permanent magnet 36 is improved further. When the stress concentration portions 28 are formed by the projections 38 and 40 formed on the extrusion die 12 and the mandrel 16, a form can be adopted in which elongated projections are formed only on either of the extrusion die 12 and the mandrel 16 so as to form stress concentration portions 28 on either of an inner surface and an outer surface of a primary extruded form 22.

EXPERIMENTAL EXAMPLES

A magnetic alloy containing 29.5% by mass of Nd, 5% by mass of Co, 0.9% by mass of B and 0.6% by mass of Ga, with the balance of being substantially Fe, was produced by melting and was quenched by a single-roll method to obtain a magnetic alloy strip having a thickness of 25 μm and an average crystal gain diameter of 0.1 μm or less. Further, this magnetic alloy strip was crushed to prepare a magnetic powder having a particle length of 300 μm or less. The magnetic powder was cold pressed at a surface pressure of approximately 3.0 tons to obtain a compact. The compact was preheated to a temperature of 600 to 900° C. in an atmosphere of Ar and was then hot pressed at a temperature of 600 to 900° C. and a pressure of 200 MPa to thereby produce a cylindrical preform. Then, an example according to the invention in which permanent magnets were produced from the preform by using the production method according to the invention for producing permanent magnets 32 having a crescent cross section was compared with a comparison example in which permanent magnets were produced from a preform which was produced under the same conditions as those described above by using the production method disclosed in JP-A-2001-15325 to investigate a difference in degree of magnetic orientation between the two examples.

As conditions in extruding the preform, the temperatures of the preform and the extrusion die 12 were in the range of 600 to 900° C., and a 50-ton hydraulic press was used as a working machine. In addition, the preform had been preheated to a temperature of 600 to 900° C. before the preform was extruded. As to specific measurement of degrees of magnetic orientation (magnetic properties) of respective permanent magnets 32 of the example of the invention and the comparison example, specimens of 7 mm (width)×7 mm (length) were cut out from central portion and both end portions in the width direction at the central portion in the length direction (extruding direction), and the specimens were then ground by 0.5 mm in a thickness direction on both sides thereof to produce specimens of 7 mm (width)×7 mm (length)×6 mm (thickness) for use in magnetic measurement. Additionally, specimens for magnetic measurement were prepared by cutting a plurality of portions of the permanent magnet 32 of each of the examples which were situated in different lengthwise positions from a front end (a distal end) of the permanent magnet 32 in the extruding direction in which the extruded form was obtained through extrusion. Then, the respective specimens for magnetic measurement were magnetized in a magnetic field of 3.2 MA/m for use in measurement. The specimens for magnetic measurement which reached saturated magnetization as a result of the magnetization were measured for a degree of magnetic orientation using a pulse excited BH tracer. The results of the measurement carried out on the example of the invention are shown in FIG. 5A, while the results of measurement carried out on the comparison example were shown in FIG. 8B.

Figure 8A:
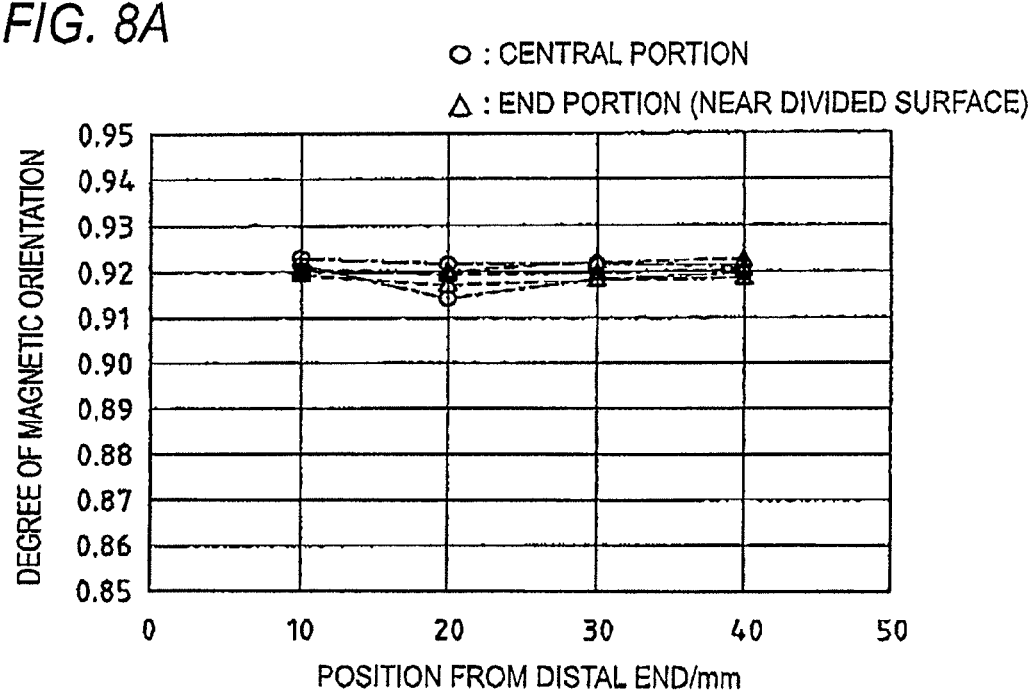
Figure 8B:
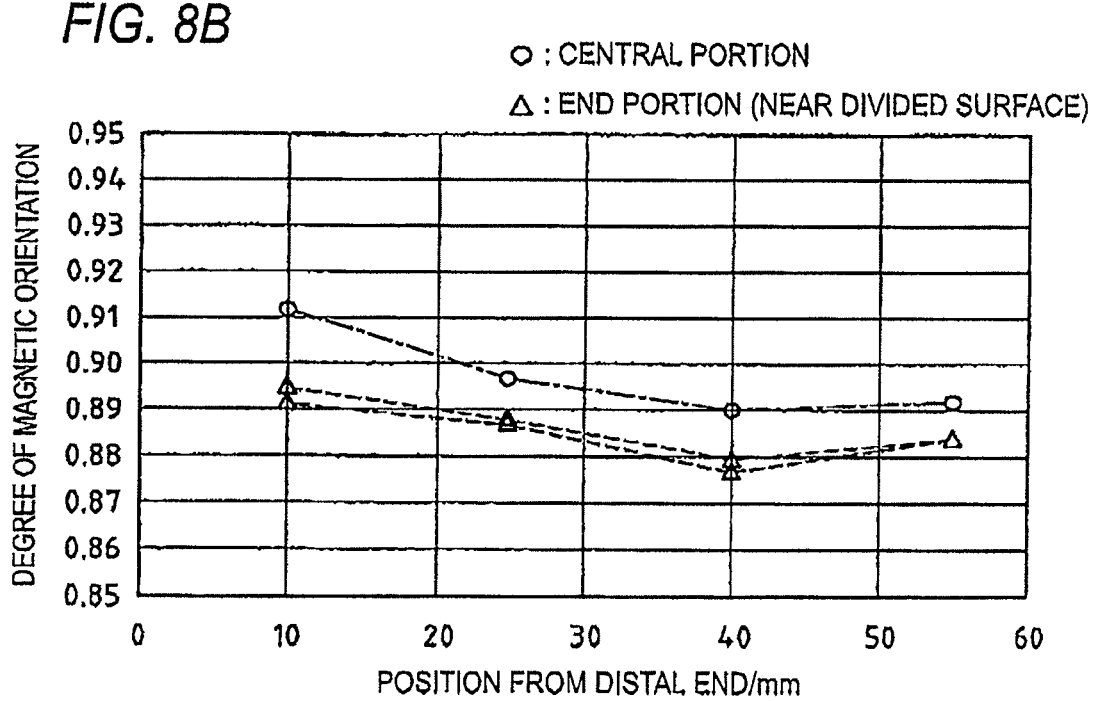

It was confirmed from the results of the experiment shown in FIGS. 8A and 8B that in the example of the invention, the degrees of magnetic orientation at the central portion and both end portions in the width direction were increased compared with those in the comparison example in which the magnets were divided at the time of extrusion, that the degree of magnetic orientation at the widthwise central portion is approximately the same as those at widthwise both end portions and that the example of the invention has uniform magnetic properties in the widthwise direction. In addition, the external appearance of the permanent magnet 32 of the example of the invention was good and no cracks were found in the divided portions, and there were found only a few defective portions which needed grinding. Namely, it was confirmed that according to the invention, it was possible to produce the permanent magnets having high magnetic properties from the extruded form which was formed through the extrusion which is superior in productivity, material yield, acceptable product ratio and production cost.

Modified Embodiments

The invention is not limited to the configurations of the embodiments and hence can be modified variously. For example, the following configurations can be adopted.

(1) In the embodiments, after the primary extruded form having the bottom portion is extruded, the bottom portion of the primary extruded portion is cut off to obtain the cylindrical secondary extruded form. However, there may also be adopted a configuration in which a cylindrical secondary extruded form is formed through extrusion which has only a cylindrical portion in which a plurality of formed portions which coincide in cross section with permanent magnets to be obtained.

(2) In Embodiment 1, while the inclined surfaces are formed at the four corner portions of the secondary extruded form, the provision of the inclined surfaces is not compulsory, and hence, the corner portions of the secondary extruded form may be kept angular.

(3) In the embodiments, while the permanent magnets having a rectangular, crescent, semi-elliptical or crescent cross section are described as being produced, the shapes of permanent magnets to be produced are not limited to those shapes, and hence, permanent magnets having a different cross section may be produced. In addition, the number of formed portions (portions corresponding to permanent magnets) which are connected together in a circumferential direction in a primary extruded form formed through extrusion should be two or more, and the number of formed portions is not limited to those illustrated in the embodiments.

(4) In Embodiments 1 to 3, projections like those in Embodiment 4 may be formed on the inner surface of the through hole in the extrusion die and the outer surface of the mandrel in positions which correspond to the stress concentration portions which are formed on the primary extruded form, and grooves may be formed on either of the inner surfaces and outer surfaces of the stress concentration portions. Additionally, in place of the projections which form the stress concentration portions, elongated projections (projecting portions) can be used which extend a predetermined length along the extruding direction. The elongated projections are not limited to those which are provided to extend along the full length of the extrusion die and the mandrel but may be such as to be provided only on an area where the mandrel is inserted into the through hole.

(5) In the embodiments, while the stress concentration portions which oppositely face each other across the center of the extruded form are compressed from the outside by the dividing jigs when dividing the extruded form at the stress concentration portions, other portions of the extruded form than the stress concentration portions may be compressed in the same manner to divide the extruded form. However, it is easier to divide the extruded form at the stress concentration portions by compressing (holding and pressing) the extruded form at the stress concentration portions rather than by compressing it at the other portions.

(6) A preform can be obtained by cold pressing a magnetic alloy powder into a compact, which is then extruded without being hot or warm pressed.

While the invention has been described in detail and with reference to specific embodiments thereof, it will be apparent to one skilled in the art that various changes and modifications can be made therein without departing from the scope thereof.

This application is based on Japanese patent application No. 2012-002512 filed Jan. 10, 2012, the entire contents thereof being hereby incorporated by reference.

What is claimed is:

1. A method for producing a plurality of permanent magnets, comprising:
   with a mandrel inserted in a through hole formed in an extrusion die, extruding a preform filled in the through hole into a filling space defined between an inner surface of the through hole and an outer surface of the mandrel by pressing the preform with a pressing punch, thereby forming a cylindrical extruded form in which at least more than two stress concentration portions extending in parallel along an extruding direction are formed so as to be spaced apart from each other in a circumferential direction; and applying an external force to the cylindrical extruded form obtained at two oppositely facing stress concentration portions to thereby divide the extruded form at the stress concentration portions into more than two permanent magnets;

wherein said extruded form, which is formed so that a radial thickness $T_1$ of the stress concentration portion is in a range of $\frac{1}{5}T_0 < T_1 < \frac{4}{5}T_0$ relative to a radial maximum thickness $T_0$, is divided at the stress concentration portions.

2. The method for producing a plurality of permanent magnets according to claim 1, wherein each of the stress concentration portions is formed on an inner surface and/or an outer surface of the extruded form by two surfaces which are successively connected in a circumferential direction so as to form an angle.

3. The method for producing a plurality of permanent magnets according to claim 2, wherein projecting portions which project into the filling space are provided on the inner surface of the through hole in the extrusion die or the outer surface of the mandrel so as to project therefrom, and grooves as radially depressed stress concentration portions are formed by the projecting portions on an inner surface or an outer surface of an extruded form which is extruded to the filling space.

4. The method for producing a plurality of permanent magnets according to claim 3, wherein the extruded form is compressed in a radial direction so that the extruded form is divided at the stress concentration portions.

5. The method for producing a plurality of permanent magnets according to claim 2, wherein the extruded form is compressed in a radial direction so that the extruded form is divided at the stress concentration portions.

6. The method for producing a plurality of permanent magnets according to claim 1, wherein projecting portions which project into the filling space are provided on the inner surface of the through hole in the extrusion die or the outer surface of the mandrel so as to project therefrom, and grooves as radially depressed stress concentration portions are formed by the projecting portions on an inner surface or an outer surface of an extruded form which is extruded to the filling space.

7. The method for producing a plurality of permanent magnets according to claim 6, wherein the extruded form is compressed in a radial direction so that the extruded form is divided at the stress concentration portions.

8. The method for producing a plurality of permanent magnets according to claim 1, wherein the extruded form is compressed in a radial direction so that the extruded form is divided at the stress concentration portions.

* * * * *